United States Patent [19]

Fradenburgh et al.

[11] 4,324,530
[45] Apr. 13, 1982

[54] HELICOPTER BLADE WITH A TIP HAVING A SELECTED COMBINATION OF SWEEP, TAPER AND ANHEDRAL TO IMPROVE HOVER EFFICIENCY

[75] Inventors: Evan A. Fradenburgh, Fairfield; William D. Jepson, Huntington; Robert C. Moffitt, Seymour, all of Conn.

[73] Assignee: United Technologies Corp., Hartford, Conn.

[21] Appl. No.: 114,131

[22] Filed: Jan. 21, 1980

[51] Int. Cl.³ .............................................. B63H 1/26
[52] U.S. Cl. ................................................... 416/228
[58] Field of Search ........................ 416/228 R, 228 A

[56] References Cited
U.S. PATENT DOCUMENTS 3,399,731  9/1968  Giles ............................... 416/228 A
3,721,507  3/1973  Monteleone .................... 416/228 A
4,077,741  3/1978  Lowson et al. ................. 416/228 A
4,130,377  12/1978 Blackwell ....................... 416/228 A

OTHER PUBLICATIONS

Weller, William H., "Experimental Investigation of Effects of Blade Tip Geometry on Loads and Performance for an Articulated Rotor System", NASA Tech. Paper 1303.

Primary Examiner—Robert E. Garrett
Attorney, Agent, or Firm—Vernon F. Hauschild

[57] ABSTRACT

A helicopter blade of high twist having an improved tip utilizing a combination of sweep, taper and anhedral to improve hover performance by unloading the blade tip and reducing the strength of the tip vortex and displacing that tip vortex away from the following blade surface.

9 Claims, 8 Drawing Figures

HELICOPTER BLADE WITH A TIP HAVING A SELECTED COMBINATION OF SWEEP, TAPER AND ANHEDRAL TO IMPROVE HOVER EFFICIENCY

DESCRIPTION

TECHNICAL FIELD

This invention relates to helicopter rotors and more particularly to improved blades for use therein having a tip of selected sweep, taper and anhedral to improve hover efficiency.

BACKGROUND ART

In the helicopter art, blade tip sweep or taper, or combinations of both have been used to improve helicopter forward flight performance. To reduce tip lift, however, this prior art utilized a substantial amount of twist in the blade tip and had to pay the penalty of increased drag resulting in increased rotor drive power requirements in forward flight due to the negative pitch or angle of attack on the advancing blade. Typical examples of the prior art using swept or tapered tips to increase helicopter forward flight performance and utilizing twist to unload the tip and control tip trailing edge vortex are Jepson U.S. Pat. No. 3,822,105 and pending Fradenburgh U.S. Application Ser. No. 968,595 entitled "Improved Helicopter Blade" and filed Dec. 11, 1978. Monteleone U.S. Pat. No. 3,721,507 teaches sweep and tip thinning but not anhedral, nor is Monteleone concerned with hover.

Lowson et al U.S. Pat. No. 4,077,741 utilizes a helicopter blade with a swept tip but for the purpose of controlling a tip leading edge vortex, as opposed to the trailing edge tip vortex of interest herein, so as to cause the tip to act as a conventional Delta wing.

Certain prior art patents teach anhedral blade or wing tips, but not in combination with sweep and taper as taught herein to improve helicopter hover performance. Sargent U.S. Pat. No. 3,411,738 teaches an anhedral tip but specifically teaches that the tip span should be small in comparison to the tip chord, which is in direct opposition to our teaching. Also, the Sargent patent teaches an anhedral configuration whereby the anhedral span diminishes from trailing edge to leading edge. Our invention incorporates an anhedral span which is constant along the local chord line. de la Cierva U.S. Pat. No. 1,692,081 teaches droop or tip anhedral but to improve the dynamic behavior of freely rotating autogiro wings. de al Cierva uses the drooped tips to provide the blade rotational centrifugal forces necessary to make the hinged, autogiro rotor stable. Of course, since the autogiro utilizes freely rotating wings it does not offer the hover operation of the power driven helicopter rotor to which our invention is directed.

Giles U.S. Pat. No. 3,399,731 teaches swept helicopter rotor wings to improve forward flight operation but includes no anhedral and is not concerned with hover performance improvement.

DISCLOSURE OF INVENTION

A primary object of the present invention is to provide an improved highly twisted helicopter rotor blade which utilizes a tip of selected sweep, taper and anhedral form to improve hover performance.

In accordance with the present invention, the selectively swept, tapered and anhedral tip of our improved helicopter blade serves to unload the tip thereby achieving a more uniform lift distribution throughout the span of the blade, and similarly producing a more uniform downwash effect, while decreasing the power required to drive the rotor.

It is a furtther object of our invention to improve hover performance by using our improved helicopter blade utilizing a selectively swept, tapered and anhedral tip, and without utilizing twist in the blade tip anhedral portion.

It is a further object of our invention to teach such an improved helicopter blade to improve hover performance, and whose selectively swept, tapered and anhedral tip both weakens the trailing edge tip vortex and directs the vortex away from the following blade.

It is a further object of our invention to teach such a helicopter blade which achieves the advantageous weak tip vortex of an unloaded blade tip and the advantageous, lessened interfering trajectory of the tip vortex of a loaded blade tip.

It is still a further object of our invention to teach such an improved helicopter blade in which the blade tip is both rearwardly swept and tapered and which incorporates anhedral in the outer 4% of the blade radius.

It is still a further object of our invention to teach such an improved helicopter blade in which the blade tip is swept rearwardly for the outer 7% of the blade radius and tapered for the outer 4% of the blade radius, and which has anhedral incorporated in the outer 4% of the blade span.

It is still a further object of our invention to teach such an improved helicopter blade in which the selectively swept, tapered and anhedral tip is in the form of a replaceable tip cap attached to a helicopter blade of high twist, such as $-16°$ equivalent linear twist, and which is sufficiently torsionally stiff that aerodynamic loading of the blade and tip in rotor operation will cause the blade to twist further between 0° and 2°.

It is still a further object of this invention to teach such a helicopter blade with a selectively shaped sweep, taper and anhedral tip which improves rotor hover and forward flight efficiency and also lowers rotor blade vibration loads, control loads, and vibratory vertical blade forces transmitted to the hub and airframe.

It is a further object of this invention to teach such an improved helicopter blade in which the combination of sweep, taper and anhedral in the blade tip increases hover efficiency 3% or more, which is equivalent to a 3% reduction in rotor diameter, increases rotor lift about 300 pounds for 10,000 pound gross weight helicopters and about 2,000 pounds for 70,000 pound gross weight helicopters, and which, for the same helicopter gross weight, increases hover ceiling 700–800 feet.

BEST MODE FOR CARRYING OUT THE INVENTION

Figure 1:
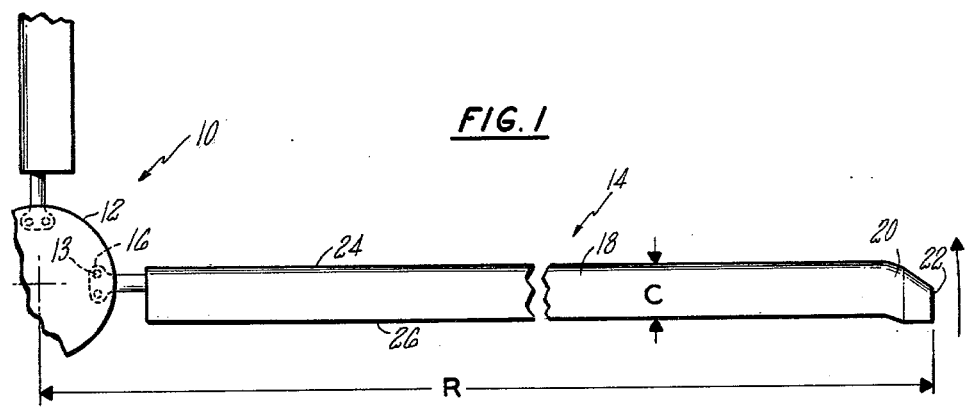
FIG. 1 is a partial plan view of a four-bladed helicopter rotor using our improved blade.

Referring to FIG. 1 we see helicopter rotor 10 utilizing our improved blade. Helicopter rotor 10 includes hub member 12 which is conventionally supported from a helicopter fuselage to be driven for rotation about the axis of rotation. A plurality of helicopter blades 14 project substantially radially from hub 12 and are supported therefrom in conventional fashion by root attachment 13. Any number of blades 14 may be used with rotor 10 and the rotor illustrated partially in FIG. 1 is a four-bladed rotor with each blade separated circumferentially approximately 90°. Since each blade 14 will be identical, a single blade only will be described.

Still referring to FIG. 1 we see that blade 14 includes root portion 16 which attaches in conventional fashion to hub 12, central portion 18 of aerodynamic shape, and tip portion 20 which culminates in blade tip 22. Blade portions 16, 18 and 20 cooperate with hub 12 to define blade radius R between the axis of rotation and blade tip 22. The blade chord C extends between the blade leading edge 24 and the blades trailing edge 26.

Our improved helicopter blade is fabricated with a selectively shaped tip which includes a selected combination of rearward sweep, taper and anhedral which coact to unload the blade tip, thereby producing a more uniform lift distribution throughout the span of the blade and also producing a more uniform downwash effect, as well as decreasing the power required to drive the rotor 10. Our improved blade, with its unique combination of sweep, taper and anhedral in its tip, reduces the intensity of the tip trailing edge vortex and also directs or displaces the tip trailing edge vortex so that it causes minimal interference on the following blade. These advantages are accomplished without the need for utilizing twist in the anhedral portion of the blade tip.

Figure 2:
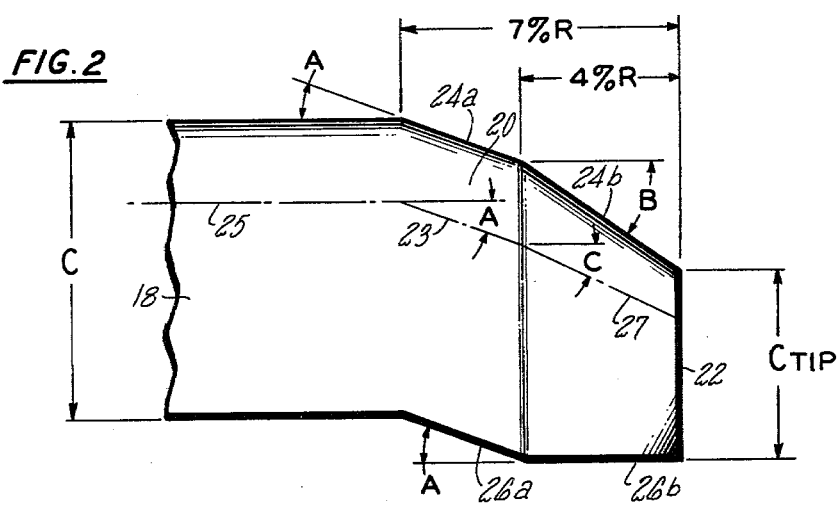
FIG. 2 is a plan view of the tip portion of our improved helicopter blade.

The specific shape of our improved blade tip portion 20 will now be described with reference to FIGS. 2 and 3. As shown in FIG. 2, tip portion 20 is swept rearwardly with leading edge portion 24a and trailing edge portion 26a being swept rearwardly angle A and leading edge portion 26a being swept rearwardly angle B. Angle A is approximately ½ angle B with angle A being preferably about 20° and angle B being preferably about 35°. Tip portion 20 is also tapered in a radially outwardly direction so that the blade tip chord $C_{tip}$ at blade tip 22 is approximately ½ the blade chord C, and preferably equal to 0.6C.

As further shown in FIG. 2, the tip portion quarter chord 23 is swept rearwardly angle A with respect to blade quarter chord and feathering axis 25. Further, tip portion quarter chord 27 is swept rearwardly angle C with respect to blade quarter chord and feathering axis 25. Angle C is preferably about 26°. Tip portion 20 varies in thickness between dimension t at its inner end, which is equal to the thickness of blade central portion 18, and tip thickness $t_{tip}$ which is approximately t/2, and preferably 0.6t, so that the chord-to-thickness ratio of the tip portion 20 is constant.

Figure 3:
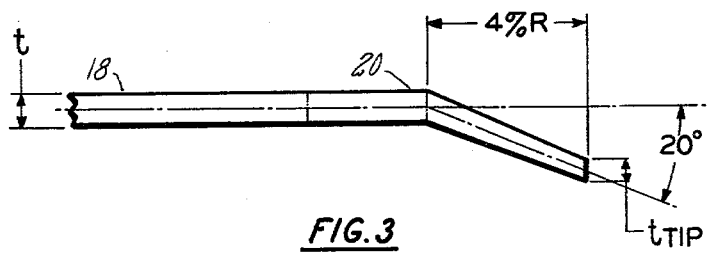
FIG. 3 is a side view, corresponding to FIG. 2, of the tip portion of our improved helicopter blade.

In addition to being swept and tapered as shown in FIG. 2, tip portion 20 incorporates anhedral as shown in FIG. 3 so that it droops downwardly at an angle, which is preferably about 20° throughout the outer 4% of blade radius R.

The 20° anhedral over the outer 4% of blade radius taught herein produces a blade tip displacement out of the rotor plane equal to about 0.014 blade radius R. Our testing reveals that this 20° anhedral sheds trailing edge tip vortexes and produces the highly favorable displacement of the shed vortex shown in FIG. 7.

Figure 4:
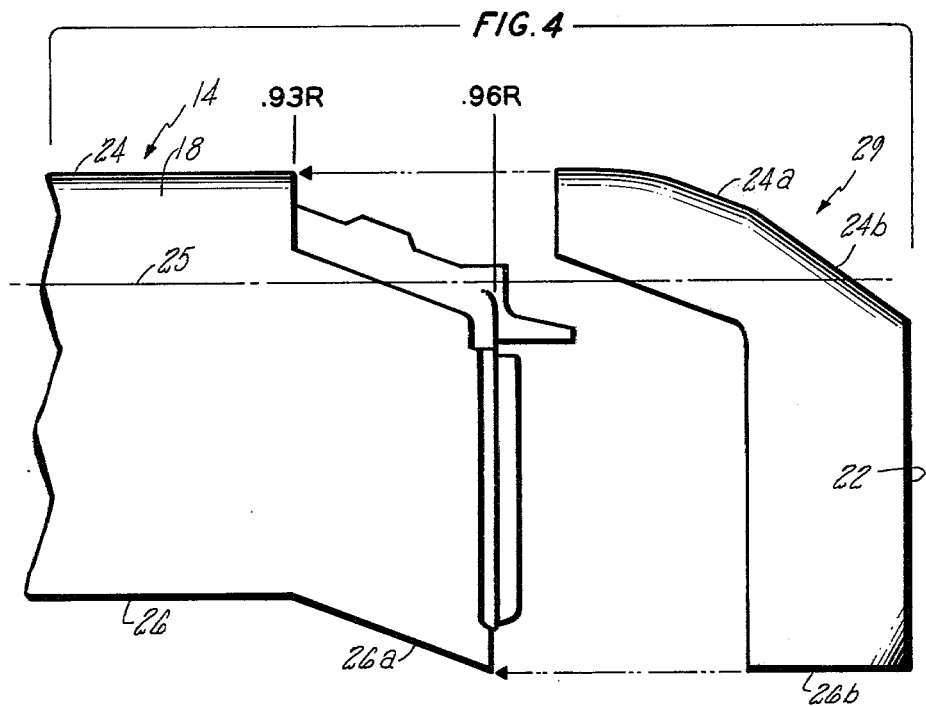
FIG. 4 is a showing of a prior art helicopter blade obtaining the benefits of our improved tip portion by the use of a selectivity shaped tip cap, which is shown in spaced relationship to the remainder of the prior art blade.
Figure 5:
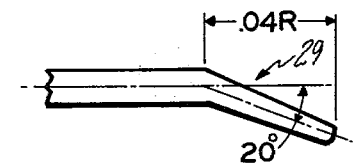
FIG. 5 is a side view showing of the tip cap disclosed in FIG. 4.

It is important to note that our selectively swept, tapered and anhedral tip is of selected radial dimension, with the sweep commencing at 93% blade radius and the taper and anhedral commencing at 96% blade radius. This construction has many advantages. First, as shown in FIGS. 4 and 5, our selectively shaped tip can be accomplished by utilizing a selectively shaped tip cap 29 in combination with a conventional, prior art blade. This gives the advantages to our construction that the blade can be made at minimal cost and utilizing known manufacturing processes, and existing prior art blades can be retrofitted to take advantage of our selectively shaped tip. Secondly, the short radial expanse of our tip adapts it well for use with torsionally stiff helicopter blades with high equivalent linear blade twist of about −16° so that, in rotor operation, aerodynamic loading of the blade and tip will cause the blade to elastically deform torsionally only about an additional 1° or 2° to a point of optimum twist in hover operation. Full particulars concerning such a high twist blade are shown in Jepson U.S. Pat. No. 3,822,105. Thirdly, since the anhedral portion of our tip includes no twist, the disadvantages of blade twist in the outer tip portions described earlier are avoided.

As a practical matter, as best shown in FIG. 4, to avoid flow separation and the attendant drag which would be caused by abruptly commencing the sweep angle of leading edge tip portion surface 24a, the leading edge 24 of central portion 18 is preferably smoothly faired into tip portion swept landing edge 24a.

It will therefore be seen that our improved tip portion 20 is swept, tapered and anhedral in selected proportions. In addition, the anhedral section of tip portion 20 is preferably of 0° linear twist. The reasons for this selected combination of sweep, taper, anhedral and twist in blade tip portion 20 will now be explained.

As explained previously, our objective is to unload blade tip portion 20 to obtain a more uniform lift distribution throughout the span of the blade, a more uniform downwash effect, and decreased power requirements to drive the rotor, to also reduce the intensity of the trailing edge tip vortex and to deflect or displace the tip vortex so that it presents minimal interference with the following blade. These objectives should be borne in mind to fully appreciate the following description of the selectively shaped tip portion 20.

With respect to rearward sweep of tip portion 20, this rearward sweep serves to reduce blade tip loading since the parameter which determines the amount of lift generated by a blade is the velocity component of the free airstream perpendicular to the local quarter chord line, and sweeping the blade tip rearwardly as shown in FIG. 2 reduces this velocity component and hence the lift generated by the tip. These local quarter chord lines in our tip 20, are shown as lines 23 and 27. This reduction of tip lift due to tip sweep serves to reduce the intensity of the trailing edge tip vortex generated and shed during rotor operation by reducing the free stream velocity acting perpendicular to the local swept quarter chord line.

Tip sweep further unloads the blade tip in that the swept tip does not receive the full pitch inputs which the remainder of the blade receives and hence the tip does not have to take the full pitch change loads which are imposed upon the remainder of the blade.

Tapering of tip 20 as shown in FIG. 2 also serves to reduce blade tip loading by reducing the tip planform area on which aerodynamic loads are imposed, and thereby also reduces the intensity of the tip trailing edge vortex.

Unfortunately, reduction of the tip trailing edge vortex intensity by the combination of sweep and taper just discussed has the adverse effect of changing the trajectory of the shed tip vortex in an undesirable fashion. This changed tip vortex trajectory brings the reduced intensity tip vortex into more intimate contacts with the following blade and therefore has a more pronounced effect upon the following blade.

Figure 6:
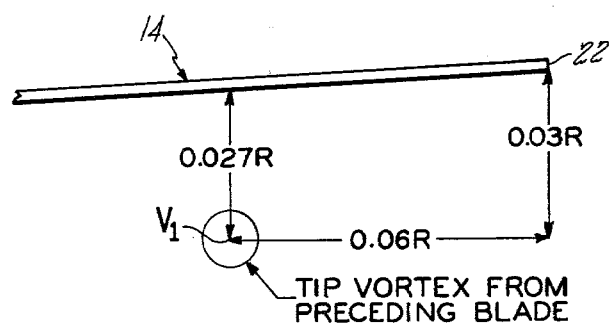
FIG. 6 is a showing of the position of a trailing edge tip vortex acting upon the following blade of the prior art, non-anhedral type blade.
Figure 7:
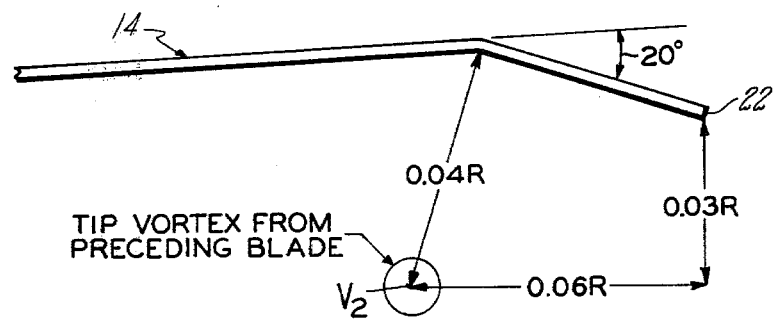
FIG. 7 is a showing of the shed trailing edge tip vortex displacement from our improved helicopter blade with its selectivity shaped tip.

It would be desirable if the blade tip could achieve the weak tip vortex of an unloaded blade tip and the desirable trajectory of the tip vortex of a loaded blade tip which has decreased interference effect upon the following blade. This desirable result is accomplished by utilizing an anhedral component as shown in FIG. 3 with the swept and tapered tip. It is a known characteristic of a shed helicopter trailing edge tip vortex that its trajectory contracts or diminishes in radius so that, with an anhedral tip, due to the contraction in radius of the shed tip vortex of a forward blade, that tip vortex will pass below the following blade in view of its radial contraction and the anhedral shape of the following blade. Our testing reveals that, whereas the tip vortex shed from the preceeding blade would be at station $V_1$ as shown in FIG. 6 with a conventional, nonanhedral (flat) tip of the prior art, the tip vortex shed from the preceeding blade is further displaced from the following blade to be at station $V_2$ when our anhedral tip is used, as shown in FIG. 7. The advantage of this tip vortex displacement from station $V_1$ to station $V_2$ is less interference with the following blade. A further advantage of our anhedral tip in causing the tip vortex to pass substantially below the following blade at station $V_2$ is that this separation of the vortex from the tip reduces the effect of the vortex on the blade tip, which effect generally is to impart lift to the tip and hence loads the tip in contradiction to our teaching.

It will therefore be seen that our improved helicopter blade with selectively swept, tapered and anhedral tip achieves serves to unload the tip and the above stated advantages thereof and also effectively reduces the intensity of the tip vortex and displaces it to a station of minimal interference upon the following blade. These advantages are accomplished without the need to use twist in the tip anhedral portion.

Figure 8:
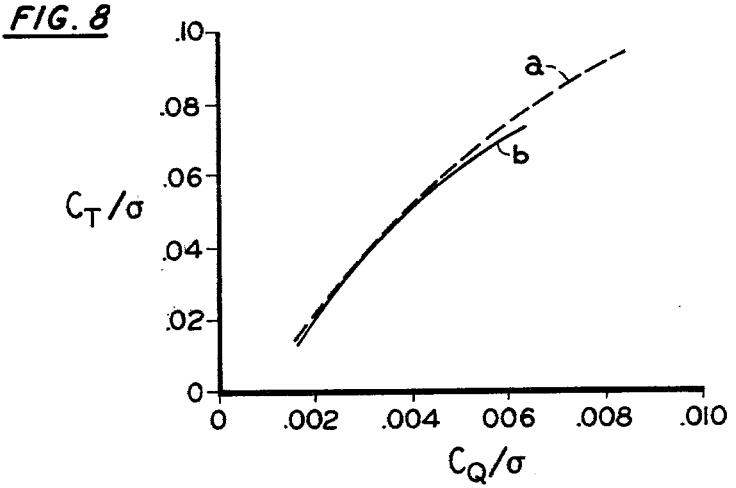
FIG. 8 is a graph showing the improvement in thrust ($C_T/\sigma$) generated by a helicopter rotor using our improved helicopter blade over a rotor using prior art blades when driven at the same rotor drive power requirements ($C_Q/\sigma$) in hover mode.

The effectiveness of our improved rotor blade can be appreciated by viewing FIG. 8 which is a plot of the thrust or lift of rotors in hover using our improved blade and prior art blades, plotted against the power required to drive the rotor. It will be noted that the rotor using our anhedral tip blade shows greater efficiency in curve a than does the rotor with prior art blades of curve b in the operating ranges. Such a prior art blade is fully shown and described in Jepson U.S. Pat. No. 3,822,105. Calculations and testing show that our improved blade increases hover efficiency or lift between 3 and 5%. This translates to hover lift increase of about 300 pounds for a 10,000 pound gross weight helicopter and up to 2,000 pounds for a 70,000 pound gross weight helicopter. For the same gross weight helicopter, hover ceiling would increase between 700–800 feet. In addition, my improved rotor will experience a reduction in rotor-induced noise.

While the main objective of our improved blade is to increase helicopter hover performance, it also provides advantages in forward flight operation since the swept tip reduces the tip Mach number normal to the airfoil leading edge. Further, the vibratory torsional moments caused by the swept tip tend to cancel adverse torsional moments which are created by blade aerodynamic pitching moments in forward flight, and vibratory vertical blade forces transmitted to the hub and fuselage are also reduced.

It will be evident to those skilled in the art that while I have disclosed a specific combination of blade tip sweep taper and anhedral with the objective of both weakening and displacing the tip vortex so as to present minimal interference with the following blade and hence increase hover efficiency and decrease the power required to drive the rotor in hover, more or less sweep, taper and anhedral may be required to accomplish my overall objective depending upon the characteristics of the particular helicopter upon which the rotor will be used.

As stated earlier, our improved helicopter blade is a blade which is fabricated by any of the well-known methods and constructions of the prior art including those taught in Jepson U.S. Pat. No. 3,822,105 and which has high equivalent linear blade twist of about −16° so that during hover operation aerodynamic loading of the blade and tip will cause the blade to torsionally deflect only about 0° to 2° to bring the blade to optimum hover twist.

It will be evident to those skilled in the art that the degree of torsional deflection just discussed may be controlled in many ways, including the use of our disclosed tip with a torsionally stiff blade or the use of our disclosed tip with a torsionally compliant blade not utilizing leading edge counterweights to balance the aft mass center of our swept tip. The particular blade tip portion 20 taught herein takes advantage of the hove efficiency improvements and manufacturing and retrofit advantages made available by using a short tip portion which may be used as a tip cap. There are helicopter blade construction which are more torsionally compliant than the blade of interest herein and which are built with a moderate degree of blade twist for a variety of manufacturing and performance reasons other than hover performance, which will require the use of a different swept, taper and anhedral tip than that taught herein. On such improved blade is taught in the patent application Ser. No. 114,137 filed on even date herewith in the name of Robert C. Moffitt and entitled "Improved Helicopter Blade With a Tip Having a Selected Combination of Sweep, Taper and Anhedral to Improve Hover Efficiency".

We wish it to be understood that we do not desire to be limited to the exact details of construction shown and described for obvious modifications will occur to a person skilled in the art.

We claim:

1. A helicopter blade having high blade twist, a leading edge, a trailing edge, a root, a tip, a chord dimension extending between said edges, and being fabricated so that aerodynamic blade loading during rotor hover operation will induce slight torsional deflection of the blade to a preferred pitch position and thereby improve rotor performance and reduce the total power required to drive the rotor and including:

a root section adapted to be connected to a helicopter rotor hub for rotation therewith about an axis of rotation, a central portion of selected aerodynamic shape connected to and extending outwardly from the blade root portion, a tip portion connected to and extending outwardly from the blade central portion to establish a blade radius between the axis of rotation and the blade tip, said blade tip portion being selectively shaped to improve helicopter hover performance by diminishing the intensity of the tip vortex generated during hover operation and directing the tip vortex away from the following blade to minimize interference therewith, said tip portion extending for approximately 7% of blade radius, said tip portion being swept rearwardly to reduce the velocity of the air in the direction of the tip local chord to thereby reduce blade tip loading and the strength of the tip trailing edge vortex generated in hover, said tip portion also being tapered so that the chord dimension at its outboard end is approximately ½ the chord dimension at its inboard end to reduce tip portion area and to thereby further reduce blade tip loading and the strength of the tip trailing edge vortex generated in hover, and said tip portion also being deflected downwardly throughout the outer 4% of blade radius so as to direct the shed trailing edge tip vortex away from the following blade in hover.

2. A helicopter blade according to claim 1 wherein said tip portion is deflected downwardly throughout the outer 4% of blade radius an angle of about 20°.

3. A helicopter blade according to claim 2 wherein said tip portion is of 0° twist throughout the outer 4% of blade radius.

4. A helicopter blade according to claim 3 wherein said blade has high equivalent linear blade twist of about $-16°$ and is sufficiently torsionally stiff that aerodynamic blade loading during hover operation will cause torsional blade deflection to a equivalent linear blade twist of about $-17° \pm 1°$.

5. A helicopter blade according to claim 4 wherein said tip portion leading edge is swept rearwardly about 20° between the blade 93% and 96% radius station, and about 35° between the blade 96% and 100% radius station, and wherein the blade trailing edge is swept rearwardly about 20° between the blade 93% and 96% radius station, and is unswept between the blade 96% and 100% radius station.

6. A helicopter blade according to claim 5 wherein the tip chord dimension at the blade tip is 0.6 times the blade chord dimension.

7. A helicopter blade according to claim 6 wherein the tip portion thickness diminishes in an outward direction so that the ratio of the tip portion thickness to the tip portion chord is constant throughout the span of the tip portion.

8. A helicopter blade according to claim 1 wherein at least a portion of said blade tip portion is a tip cap.

9. A helicopter blade according to claim 1 wherein the displacement of said blade tip due to the downward deflection of said tip portion is about 0.014 of the blade radius.

* * * * *

UNITED STATES PATENT AND TRADEMARK OFFICE
CERTIFICATE OF CORRECTION

PATENT NO. : 4,324,530

DATED : April 13, 1982

INVENTOR(S) : Evan A. Fradenburgh; William D. Jepson; Robert C. Moffitt

It is certified that error appears in the above-identified patent and that said Letters Patent is hereby corrected as shown below:

Col. 5, Line 58   Delete "achieves"; after "tip and" insert
--achieves--

Signed and Sealed this

Twenty-fifth Day of October 1983

[SEAL]

Attest:

GERALD J. MOSSINGHOFF

Attesting Officer   Commissioner of Patents and Trademarks